United States Patent
Baek et al.

(10) Patent No.: US 11,308,789 B2
(45) Date of Patent: Apr. 19, 2022

(54) METHOD FOR PROVIDING LOW-POWER IOT COMMUNICATION-BASED GEO-FENCE SERVICE ON BASIS OF CONTEXT AWARENESS INFORMATION OF POSITION TRACKING DEVICE

(71) Applicant: AMOTECH CO., LTD., Incheon (KR)

(72) Inventors: Hyungil Baek, Yongin-si (KR); Hoeyoung Hwang, Gunpo-si (KR); Kyunghyun Ryu, Seoul (KR); Semin Oh, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 144 days.

(21) Appl. No.: 16/958,694

(22) PCT Filed: May 28, 2019

(86) PCT No.: PCT/KR2019/006346
§ 371 (c)(1),
(2) Date: Jun. 27, 2020

(87) PCT Pub. No.: WO2019/231199
PCT Pub. Date: Dec. 5, 2019

(65) Prior Publication Data
US 2020/0349831 A1    Nov. 5, 2020

(30) Foreign Application Priority Data

May 30, 2018 (KR) .................. 10-2018-0062009
May 22, 2019 (KR) .................. 10-2019-0059777

(51) Int. Cl.
*H04W 4/90* (2018.01)
*G08B 25/01* (2006.01)
(Continued)

(52) U.S. Cl.
CPC ......... *G08B 25/016* (2013.01); *G08B 21/023* (2013.01); *G08B 21/0211* (2013.01);
(Continued)

(58) Field of Classification Search
None
See application file for complete search history.

(56) References Cited

U.S. PATENT DOCUMENTS 9,706,380 B1   7/2017 Murchison
9,930,619 B2   3/2018 Kim et al.
(Continued)

FOREIGN PATENT DOCUMENTS

JP    2014-200047      10/2014
KR    10-2016-0023065   3/2016
(Continued)

OTHER PUBLICATIONS

Extended European Search Report dated Aug. 16, 2021, issued in European Patent Application No. 19811249.2.
(Continued)

*Primary Examiner* — Dai Phuong
(74) *Attorney, Agent, or Firm* — Capitol IP Law Group, PLLC (57) ABSTRACT

A method for providing a low-power IoT communication-based geo-fence service on the basis of context awareness information of a position tracking device can comprise the steps of: allowing a context analysis engine of a position tracking device to measure context awareness information, obtained from peripheral sensors capable of receiving signals from the surroundings, such as a user's heart rate, body temperature, and movement state; determining whether a situation is emergency or ordinary on the basis of the context awareness information measured by the context analysis
(Continued)

engine of the position tracking device; transmitting an emergency message and a measured position value to a server by using low-power IoT communication when the situation is determined to be emergency; after transmitting the emergency message, selecting a module capable of stably tracking a position from among a global positioning system (GPS), wireless fidelity (Wi-Fi) sniffing, Bluetooth low energy (BLE), and ultrawide band (UWB) modules of the position tracking device for position tracking; measuring mobile position information of a position tracking device user by using the selected position tracking module; checking whether the measured mobile position information, and the context awareness information, obtained from the peripheral sensors capable of receiving signals from the surroundings, such as the user's heart rate and body temperature can be transmitted by being converted through real-time communication; transmitting the context awareness information to the server at a frequent transmission cycle and at a data rate higher than that of ordinary times through real-time communication, if transmission through real-time communication is possible; receiving an emergency cancellation message from a server manager on the basis of the mobile position information and the context awareness information; and receiving the emergency cancellation message, and then transmitting, to the server, the context awareness information, obtained from the peripheral sensors capable of receiving signals from surroundings of the position tracking device user, such as the heart rate, body temperature and movement state, by converting the context awareness information through low-power IoT communication at a reduced transmission cycle and at a data rate lower than that of an emergency.

11 Claims, 5 Drawing Sheets

(51) Int. Cl.
| | |
|---|---|
| *H04W 4/38* | (2018.01) |
| *H04W 4/70* | (2018.01) |
| *H04W 4/029* | (2018.01) |
| *G08B 21/02* | (2006.01) |
| *G08B 21/04* | (2006.01) |
| *G08B 21/12* | (2006.01) |
| *H04W 4/021* | (2018.01) |
| *H04W 4/02* | (2018.01) |
| *H04W 28/04* | (2009.01) |
| *H04W 52/02* | (2009.01) |

(52) U.S. Cl.
CPC ..... *G08B 21/0261* (2013.01); *G08B 21/0269* (2013.01); *G08B 21/0272* (2013.01); *G08B 21/043* (2013.01); *G08B 21/0415* (2013.01); *G08B 21/0446* (2013.01); *G08B 21/12* (2013.01); *H04W 4/021* (2013.01); *H04W 4/027* (2013.01); *H04W 4/029* (2018.02); *H04W 4/38* (2018.02); *H04W 4/70* (2018.02); *H04W 4/90* (2018.02); *H04W 28/04* (2013.01); *H04W 52/0251* (2013.01)

(56) References Cited

U.S. PATENT DOCUMENTS

| | | | |
|---|---|---|---|
| 2010/0124901 A1* | 5/2010 | Shi | H04W 4/90 455/404.2 |
| 2014/0295784 A1 | 2/2014 | Saito | |
| 2015/0269827 A1 | 9/2015 | Hopkins et al. | |
| 2017/0108715 A1* | 4/2017 | Bauer | H04W 4/14 |
| 2017/0238129 A1 | 8/2017 | Maier et al. | |
| 2018/0117447 A1 | 5/2018 | Tran et al. | |
| 2018/0342139 A1* | 11/2018 | Otavio | G08B 21/182 |
| 2019/0197864 A1* | 6/2019 | Hui | G08B 21/0277 |
| 2020/0053538 A1* | 2/2020 | Zheng | H04W 12/02 |

FOREIGN PATENT DOCUMENTS

| | | |
|---|---|---|
| KR | 10-1755533 | 7/2017 |
| KR | 10-2017-0099352 | 8/2017 |
| KR | 10-1826298 | 2/2018 |

OTHER PUBLICATIONS

International Search Report dated Sep. 11, 2019 in International Patent Application No. PCT/KR2019/006346.

* cited by examiner

METHOD FOR PROVIDING LOW-POWER IOT COMMUNICATION-BASED GEO-FENCE SERVICE ON BASIS OF CONTEXT AWARENESS INFORMATION OF POSITION TRACKING DEVICE

TECHNICAL FIELD

The present invention relates a method of providing a geo-fence service based on situation recognition information of a location tracking device in low-power IoT communication, in detail, the present invention relates the method of providing low-power consuming geo-fence service in accordance with situation recognition information of the location tracking device through the low-power consuming IoT communication.

BACKGROUND ART

Recently, the geo-fence service of location tracking device using the low-power communication network have been proposed for the elderly people with dementia to prevent death or injury due to in-home departure and zone departure. In addition, the market for devices for providing such service in low-power communication network targeting elderly people with dementia is expanding to pet and livestock.

In general, the Geo-Fence is a compound word of Geographic and Fence, and refers to a virtual fence installed in a specific geographic area using a location-based service (LBS). The Geo-Fencing is an application program interface (API) that supports the virtual fence on a specific area. The Geo-Fencing is an interface using a Global Positioning System (GPS), which is one of the location tracking technologies, and allows a user to check an access status of virtual fence by designating the virtual fence in the form of a circle or a square in the specific area through the GPS.

However, since the currently used Geo-Fence service is provided using a mobile communication network, a Bluetooth communication, or a Wireless Fidelity (WIFI) communication, the service fee is expensive, or the service is available only in the area where specific communication equipment is installed. Moreover, due to the limitation of the battery capacity of the location tracking device, there have been difficulties in expanding the service.

Accordingly, in order to overcome high cost, tracking time, and limitation of battery capacity, devices and methods using low power location tracking method and communication network have been proposed.

An effective power consuming Geo-Fence service is needed through combining an advantage of low power communication network, a Soft Ware (SW) platform having compatibility for various data and an effective analysis engine of wearable device such as the location tracking device.

SUMMARY

Technical Problem

It is an object of the present disclosure to provide a method of providing a Geo-Fence service in accordance with situation recognition information of a location tracking device in low-power IoT communication.

Technical Solution

To solve the above problem and defects, the present invention provides a method of providing geo-fence service based on a situation recognition information of a location tracking device through a Low Power IoT communication method, comprising: detecting the situation recognition information measured by a situation analysis engine of the location tracking device, wherein the situation analysis engine measures a heart rate of a user, a body temperature, a movement state of user, and sensing signals from peripheral sensors of the location tracking device; determining based on the situation recognition information whether a situation is an emergency or a normal situation defined by the situation analysis engine; transmitting an emergency notice message and a detected location tracking data of the emergency situation to a network through a Low Power IoT communication method when the situation is the emergency situation; selecting a most stable location tracking module of the location tracking device in the detected emergency location after transmitting the emergency notice message, wherein the location tracking module is one of a Global Positioning System (GPS), a Bluetooth Low Energy (BLE), a WIFI Sniffing, and an Ultra-Wide Band (UWB) module; obtaining the location tracking data by the selected the location tracking module; checking whether the situation recognition information and the location tracking data are transmitted through a real-time communication method rather than the Low Power IoT communication method in the detected emergency location; transmitting the situation recognition information and the location tracking data through a real-time communication method at a higher data rate and in a frequent transmission cycle than the normal situation if the situation recognition information and the location tracking data are transmitted through the real-time communication method; detecting the situation recognition information that the emergency situation is an end; and transmitting the location tracking data and the situation recognition information through the Low Power IoT communication method at a lower data rate and less frequent transmission cycle than the emergency situation.

In an embodiment of the present invention, the location tracking device includes status definitions that a Standby Status referring a standby state after the initialization of the location tracking device, a Sensor Sensing Status referring a state that measures the heart rate, the body temperature, and a fall-down, an Emergency Status referring a state of processing when the defined emergency situation is occurred, a Status Analysis referring a state of analyzing and managing information from each status, an Indoors/Outdoors detection referring a state of analyzing whether the location of the location tracking device is indoor or outdoor, an Indoor Status referring a state of processing and managing when the location of the location tracking device is indoor, an Outdoor Status referring a state of processing and managing when the location of the location tracking device is outdoor, an Indoor Interference Status referring a state of checking and observing the change of location data indoor, an Outdoor Interference Status referring a state of checking and observing the change of location data in the outdoor, a Geo-Fencing Control Status referring a state of processing when the user deviates from the geo-fence.

In an embodiment of the present invention, wherein the situation analysis engine includes a life/death determination block for determining the life/death of user by measuring the heart rate, the body temperature, the fall-down, an ejection of gas or toxic from the peripheral sensors in a surrounding where the location tracking device is located, a location tracking block for performing a location tracking with the GPS, the BLE, the WIFI Sniffing, or the UWB module, a loss-prevention block for detecting whether the user deviates from the geo-fence area and provide a notification service to the user about the deviation from geo-fence area, a fall down determination block for detecting whether the fall-down has occurred to the user and transmit the fall-down information to the network for an emergency processing In an embodiment of the present invention, wherein the defined emergency situations by the situation analysis engine are a situation in which the heart rate is significantly reduced or disappears, a situation in which fire or toxic gas ejection is detected by the peripheral sensors in the surrounding of the location tracking device, a situation in which the user's location is not tracked or deviates from the geo-fence area, and a situation in which the user's fall down is detected.

In an embodiment of the present invention, wherein the Low Power IoT communication method is a Sigfox and a broadcasting transmission method.

In an embodiment of the present invention, wherein the step of selecting the most stable location tracking module of location tracking device among the GPS, the WIFI Sniffing, the BLE, and the UWB module comprising: determining whether location tracking data is stably obtained using a module used for location tracking before determining the emergency situation based on the situation recognition information, if the location tracking data is not stably obtained using the used location tracking module, searching other location tracking module which is most stably obtainable the location tracking data, and obtaining the location tracking data by the searched location tracking module.

In an embodiment of the present invention, wherein the step of checking whether the situation recognition information and the location tracking data are transmitted through the real-time communication method rather than the Low Power IoT communication method in the detected emergency location, further comprising: checking whether a response (ACK/NACK) message for the situation recognition information and the location tracking data sent from the location tracking device is received, checking whether the situation recognition information and the location tracking data is retransmitted based on an interference recovery operation when the response message indicates that the situation recognition information and the location tracking data are not properly transmitted to the network.

In an embodiment of the present invention, wherein the situation recognition information and the location tracking data are transmitted through the low-power IoT communication method when the response (ACK/NACK) message for the situation recognition information and the location tracking data sent from the location tracking device is not received.

In an embodiment of the present invention, wherein the situation recognition information and the location tracking data are transmitted through one of a Long Range (LoRa), a Narrow Band Internet of Things (NB-IoT) communication network when the response (ACK/NACK) message for the situation recognition information and the location tracking data sent from the location tracking device is received, and the situation recognition information and the location tracking data are not retransmitted based on the interference recovery operation when the response message indicates that the situation information and the location tracking data are not properly transmitted to the network.

In an embodiment of the present invention, wherein the real-time communication method is an LTE (Long term evolution) Category (CAT) M1 communication method.

In an embodiment of the present invention, further comprising; checking whether the situation recognition information and the location tracking data are transmitted through the real-time communication method at certain interval when the response (ACK/NACK) message for the situation recognition information and the location tracking data sent from the location tracking device is not received and the situation recognition information and the location tracking data are transmitted through the low-power IoT communication method.

Advantageous Effects

The effect of the present invention is to minimize the power consumption based on the variable period reporting and communication method according to the situation recognition information of the location tracking device to be able to sufficiently cope with the emergency situation with a limited amount of battery of the location tracking device.

However, the effects of the present invention are not limited to the above effects, and may be variously extended without departing from the spirit and scope of the present invention.

DETAILED DESCRIPTION OF THE EMBODIMENTS

Hereinafter, exemplary embodiments of the present invention will be described in detail with reference to the accompanying drawings, which will be readily apparent to those skilled in the art to which the present invention pertains.

The present invention may be embodied in many different forms and is not limited to the embodiments described herein. In the drawings, parts not relating to the description are omitted for clarifying the present invention, and the same reference numerals are assigned to the same or similar components throughout the specification.

The present invention is based on a Sigfo, a Long Range (LoRa), a Narrow Band Internet of Things (NB-IoT) based on the advantages of the location tracker, such as bio-signal monitoring, a light weight analysis engine based on monitored data, and SW platform structure compatible with data. It is based on the functional combination of low-power and long-distance data transmission, which is an advantage of the communication method. This invention may provide a method to increase the synergy effect with the low-power and low-cost through the combination.

Figure 1:
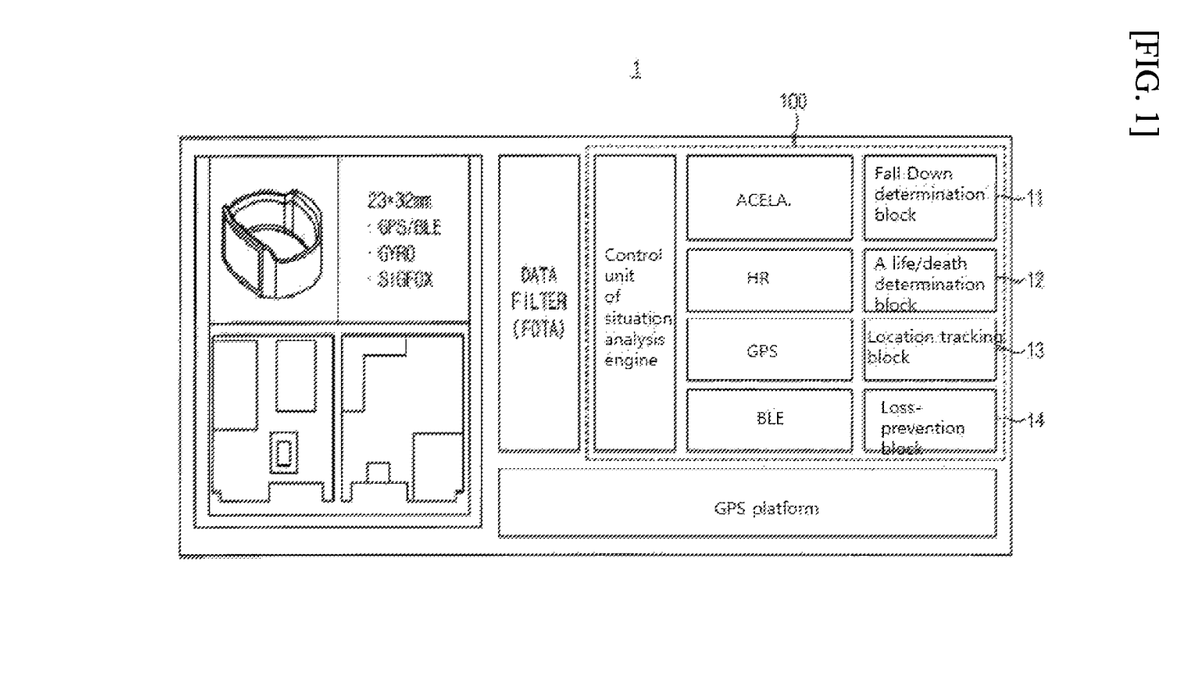
FIG. 1 is a functional block diagram of a situation analysis engine of a location tracking device according to an embodiment of the present invention.

FIG. 1 is a functional block diagram of a situation analysis engine 100 of location tracking device 1 according to an embodiment of the present invention.

Referring to FIG. 1, the situation analysis engine 100 may have the main function of determining various situations encountered by a user who has the location tracking device 1.

Among the situation analysis engine 100, a life/death determination block 12 may determine the life/death of user by measuring the heart rate. Accordingly, the user's body temperature measured with a thermometer may be used as an auxiliary means for determining whether user survives or not. In addition, the movement information from an accelerometer and the received situation information from peripheral sensors may be used as the auxiliary means to determine whether the user survives or not.

The Peripheral sensors may refer to sensors that are periodically transmitting signals using IOT communication in the vicinity of the location tracking device 1. The situation analysis engine 100 may have functions of detecting and analyzing these received signals from the peripheral sensors.

A location tracking block 13 of the situation analysis engine 100 may perform a location tracking with a Global Positioning System (GPS), a Bluetooth Low Energy (BLE), a WIFI Sniffing, or an Ultra-Wide Band (UWB) module.

A loss-prevention block 14 of the situation analysis engine 100 may detect whether the user deviates from the geo-fence area and provide a notification service to the user about the deviation from geo-fence area.

In the situation analysis engine 100, a fall down determination block 11 may detect whether a fall-down has occurred to the user and transmit the fall-down information to the network for an emergency processing.

The situation analysis engine 100 may define criteria that can be regarded as emergency situations with respect to matters determined in various functional blocks.

The life/death determination block 12 may determine that an emergency situation has occurred when there is the situation in which the user's heart rate is significantly reduced or disappears. The life/death determination block 12 may determine the emergency situation, such as fire or toxic gas ejection based on the receiving signals from the peripheral sensors.

The location tracking block 13 may determine that the user is in the emergency situation which is an emergency location tracking required because the user's location is not tracked.

The loss-prevention determination block 14 may determine that the user is in the emergency situation when the user deviates from the geo-fence area.

The fall down determination block 11 may determine that the user is in the emergency situation when the position of user is detected to fall down.

Based on the definition of the situation recognition, the situation analysis engine 100 of the location tracking device 1 may determine the situations encountered by the user and change the communication method in the location tracking device 1 accordingly to minimize power consumption for long time data transmission.

Figure 2:
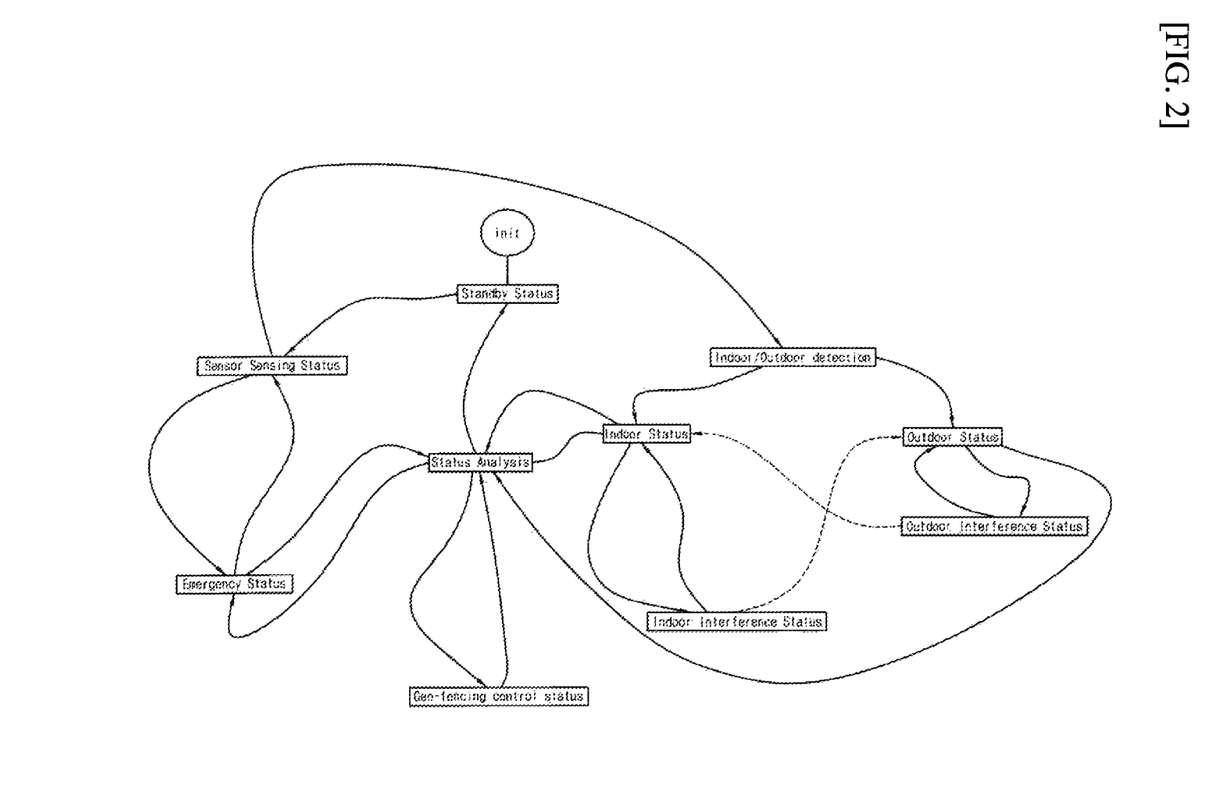
FIG. 2 is state definitions for the situation-recognition of the situation analysis engine and various state transition diagrams.

FIG. 2 is state definitions for the situation-recognition of the situation analysis engine and various state transition diagrams.

Referring to FIG. 2, the Standby Status may refer a standby status after the initialization of the location tracking device 1, at which time a system check of the location tracking device 1 is performed.

A Sensor Sensing Status may refer a status that measures a heart rate, a body temperature, and an acceleration, and checks whether this state is an emergency or not.

An Emergency Status may refer a status of processing when the emergency state occurs according to the definition of the emergency.

A Status Analysis may mean a status that is in charge of analyzing and managing information from each status.

An Indoor/Outdoor detection may mean a location analysis on whether the location of the location tracking device 1 is in an indoor or an outdoor.

An Indoor Status may refer a status of processing and managing when the location of the location tracking device 1 is in the indoor.

An Outdoor Status may refer to a status of processing and managing when the location of the location tracking device 1 is in the outdoor.

An Indoor Interference Status may refer a status of checking and observing the change of location data in the indoor.

An Outdoor Interference Status may refer a status of checking and observing the change of location data in the outdoor.

A Geo-Fencing Control Status may refer a status in which a processing for the location tracking device 1 when the user leaves the geo-fence.

Referring to FIG. 2, all status can be transitioned to other status at any time or freely.

Figure 3:
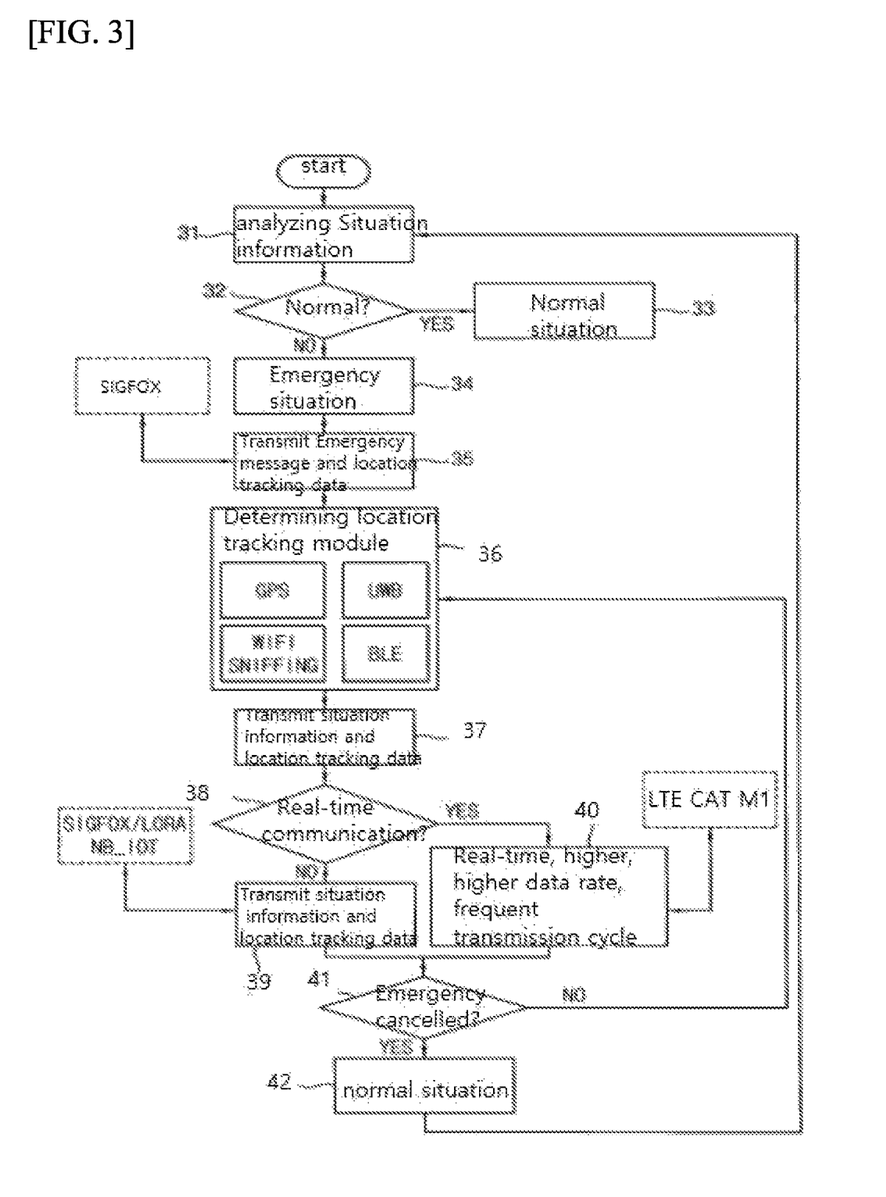
FIG. 3 is a flow chart showing a method for transmitting a location tracking data in an emergency situation according to the situation-recognition.

FIG. 3 is a flow chart showing a method for transmitting the location tracking data in an emergency situation according to the situation-recognition.

After the initialization of the location tracking device 1, the location tracking device may communicate with the network using a low-power IoT communication method. The situation analysis engine 100 receives the situation recognition information measured by the life/death determination block 12, the location tracking block 13, the loss-prevention block 14, and the fall down determination block 11, the peripheral sensors, respectively (S31).

The situation analysis engine 100 may determine based on the situation recognition information whether the situation is an emergency or a normal situation (S32). The situation recognition information may be based on user's heart rate, the body temperature, the fall-down state, the sensing information from the peripheral sensors. The emergency situation may be a situation in which the heart rate is significantly reduced or disappears, a situation in which fire or toxic gas ejection is detected by the peripheral sensors in the vicinity of the location tracking device 1, a situation in which the user's location is not tracked or deviates from the geo-fence area, and a situation in which the user's fall down is detected (S34).

When the situation analysis engine 100 of the location tracking device 1 determines that it is in the normal state, the location tracking device 1 may periodically sense the situation information and transmit the information to the network using the low-power IoT communication method (S33).

If the situation is an emergency situation defined by the situation analysis engine, an emergency notice message and a measured location tracking data on the detected emergency position may be transmitted to a network using currently connected low-power IoT communication method (S35). When it is determined that the emergency situation, the emergency message and the measured location tracking data are transmitted to the server using a low-power IoT communication method (S35).

The low-power IoT communication method may be SIGFOX, and may be referred to as a low-power communication method of a one-way broadcasting method that does not transmit a response message for a received signal.

After the emergency message is transmitted, the most stable location tracking module in current location may be selected from the GPS, the WIFI Sniffing, the BLE, or the UWB module of the location tracking device 1 (S37).

Figure 4:
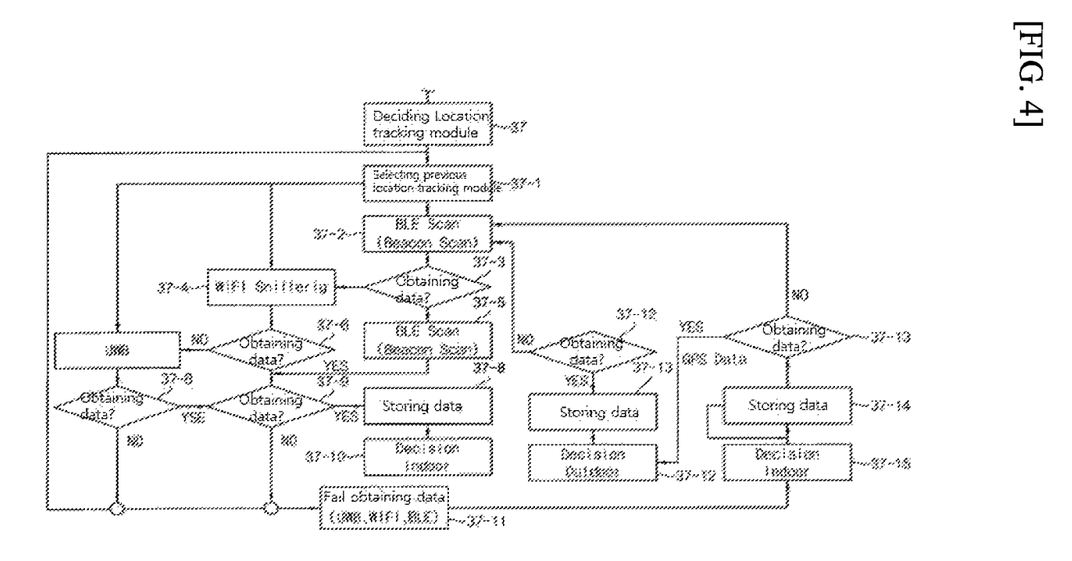
FIG. 4 is a flow chart showing a method for selecting a location tracking module in a normal situation according to the situation-recognition.

FIG. 4 is a flow chart showing a method for selecting a location tracking module in a normal situation according to the situation-recognition. Referring to FIG. 4, the step of selecting the most stable location tracking module of location tracking device among the GPS, the WIFI Sniffing, the BLE, and the UWB module include checking whether the location tracking data is stably obtained using a module used for location tracking before determining the emergency situation based on the situation recognition information. wherein the location tracking module which is the most stably obtainable the location tracking data may have the least delay time and the least failure chances to obtain the location tracking data. If the location tracking data is not stably obtained using the used location tracking module, searching other location tracking module which is most stably obtainable the location tracking data, and obtaining the location tracking data by the searched location tracking module. That is, if the module that was previously tracking of location is BLB, try to measure the location with the BLE module (S37-2, S37-3).

However, if the location measurement is not possible with the BLE module, the location measurement is attempted sequentially with modules such as WIFI Sniffing and UWB, the module that successfully measures the location tracking data may be determined (S37-4~S37-15).

If the location is measured with one of the BLE, WIFI Sniffing, or UWB modules, it may be estimated that the user's location is in the indoor (S37-15)

However, if the location measurement is not performed with any one of the BLE, WIFI Sniffing, and UWB modules and the location is measured using only the GPS module, the location of location tracking may be outdoor (S37-12).

Using the selected location tracking module, the location of the user of the location tracking device 1 may be measured by using the selected location tracking module.

The next step may be check whether the measured moving information, the user's heart rate, body temperature, situation recognition information from peripheral sensors may be transmitted with a real-time communication method (S38).

Figure 5:
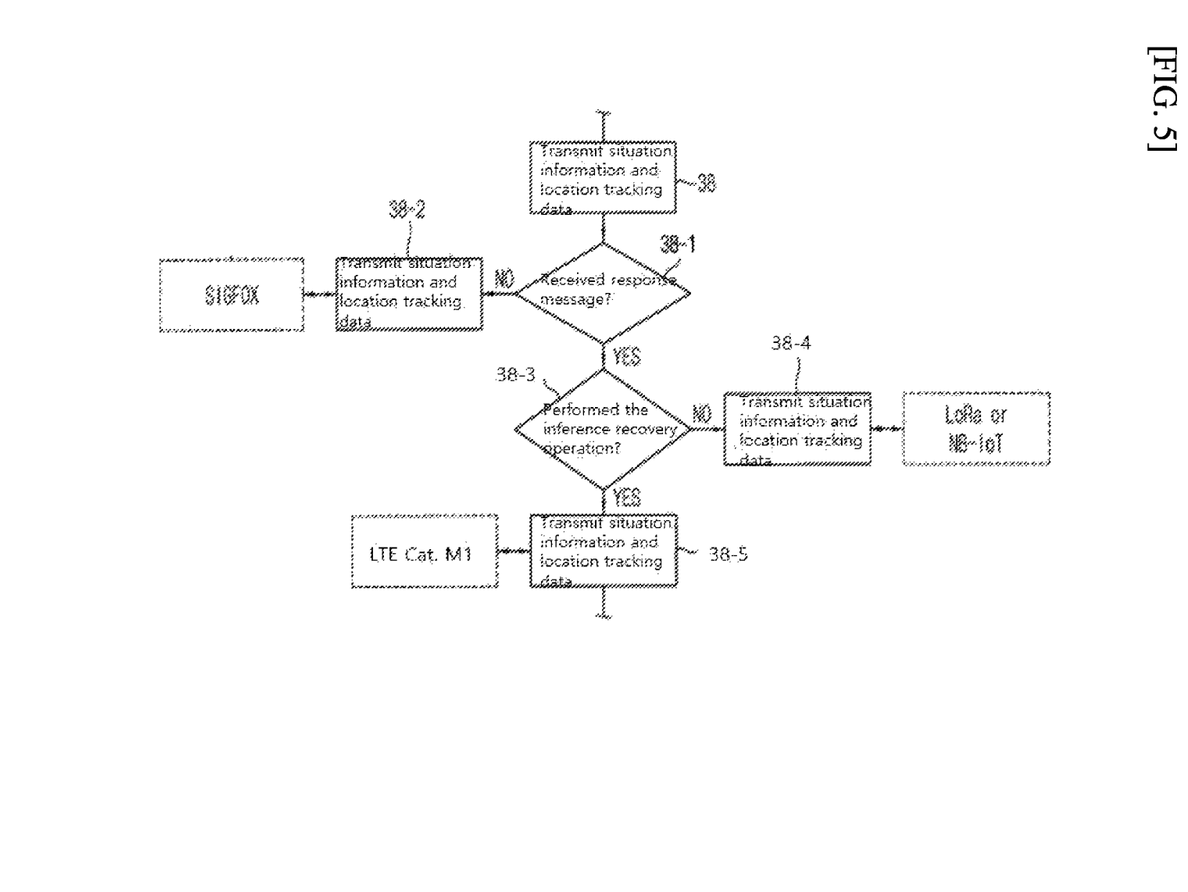
FIG. 5 is a flow chart showing a method for determining a communication module according to the situation-recognition information.

FIG. 5 is a flow chart showing a method for determining a communication method according to the situation-recognition information. The step of checking whether the location tracking data and situation recognition information are transmitted by the real-time communication method may include a response (ACK/NACK) message for the situation recognition information and the location tracking data sent from the location tracking device is received (S38-1). If the response message is not received, the situation information and the location tracking data are transmitted through the low-power IoT communication method. The low-power communication method is a Sigfox and a broadcasting transmission (S38-2)

In addition, the step of checking whether the location tracking data and situation recognition information are transmitted by the real-time communication method further comprising a step of checking whether checking whether the situation recognition information and the location tracking data is retransmitted based on an interference recovery operation when the response message indicates that the situation recognition information and the location tracking data are not properly transmitted to the network (S38-4). If the response message is received, checking whether the situation recognition information and the location tracking data is retransmitted based on an interference recovery operation when the response message indicates that the situation information and the location tracking data are not properly transmitted or decoded from a network (S38-7).

The situation recognition information and the location tracking data are transmitted through one of the LoRa, and the NB-IoT communication network when the response (ACK/NACK) message for the situation recognition information and the location tracking data sent from the location tracking device is received, and the situation recognition information and the location tracking data are not retransmitted based on the interference recovery operation when the response message indicates that the situation information and the location tracking data are not properly transmitted to the network.

If the response (ACK/NACK) message for the situation recognition information and the location tracking data sent from the location tracking device is not received and the situation recognition information and the location tracking data are transmitted through the Low Power IoT communication method, checking whether the situation recognition information and the location tracking data are transmitted through the real-time communication method at certain interval.

Based on the check steps, if the location tracking data is transmitted through the real-time communication method, the situation recognition information and the location tracking data through a real-time communication method at a higher data rate and in a frequent transmission cycle than the normal situation (S42).

The UWB communication method is an LTE (Long term evolution) Category (CAT) M1 communication method.

The situation recognition information that the emergency situation is an end may be detected from the situation analysis engine (S44).

The location tracking data and the situation recognition information may be transmitted through the Low Power IoT communication method at a lower data rate and less frequent transmission cycle than the emergency situation (S45).

As described above, the present disclosure has been described with respect to particularly preferred embodiments. However, the present disclosure is not limited to the above embodiments, and it is possible for one who has an ordinary skill in the art to make various modifications and variations, without departing off the spirit of the present disclosure.

As described above, the present disclosure has been described with respect to particularly preferred embodiments. However, the present disclosure is not limited to the above embodiments, and it is possible for one who has an ordinary skill in the art to make various modifications and variations, without departing off the spirit of the present disclosure.

1: LOCATION TRACKING DEVICE 100: SITUATION ANALYSIS ENGINE
11: FALL-DOWN DETERMINATION BLOCK 12; LIFE/DEATH DETERMINATION BLOCK
13: LOCATION TRACKING BLOCK 14: LOSS-PREVENTION BLOCK

The invention claimed is:

1. A method of providing geo-fence service based on a situation recognition information of a location tracking device through a low-power IoT communication method, comprising:

detecting the situation recognition information measured by a situation analysis engine of the location tracking device, wherein the situation analysis engine measures a heart rate of a user, a body temperature, a movement state of user state, and sensing signals from peripheral sensors of the location tracking device;

determining based on the situation recognition information whether a detected situation is an emergency or a normal situation defined by the situation analysis engine;

transmitting an emergency notice message and a detected location tracking data of the emergency situation to a network through a low-power IoT communication method when the situation is the emergency situation;

selecting a most stable location tracking module of the location tracking device in the detected emergency location after transmitting the emergency notice message, wherein the location tracking module is one of a Global Positioning System (GPS), a Bluetooth Low Energy (BLE), a WIFI Sniffing, and an Ultra-Wide Band (UWB) module;

obtaining the location tracking data by the selected the location tracking module;

checking whether the situation recognition information and the location tracking data are transmitted through a real-time communication method rather than the low-power IoT communication method in the detected emergency location;

transmitting the situation recognition information and the location tracking data through a real-time communication method at a higher data rate and in a frequent transmission cycle than the normal situation if the situation recognition information and the location tracking data are transmitted through the real-time communication method;

detecting the situation recognition information that the emergency situation is an end; and transmitting the location tracking data and the situation recognition information through the low-power IoT communication method at a lower data rate and less frequent transmission cycle than the emergency situation.

2. The method of claim 1, wherein the location tracking device includes status definitions that a Standby Status referring a standby state after the initialization of the location tracking device, a Sensor Sensing Status referring a state that measures the heart rate, the body temperature, and a fall-down, an Emergency Status referring a state of processing when the defined emergency situation is occurred, a Status Analysis referring a state of analyzing and managing information from each status, an Indoors/Outdoors detection referring a state of analyzing whether the location of the location tracking device is indoor or outdoor, an Indoor Status referring a state of processing and managing when the location of the location tracking device is indoor, an Outdoor Status referring a state of processing and managing when the location of the location tracking device is outdoor, an Indoor Interference Status referring a state of checking and observing the change of location data indoor, an Outdoor Interference Status referring a state of checking and observing the change of location data in the outdoor, a Geo-Fencing Control Status referring a state of processing when the user deviates from the geo-fence.

3. The method of claim 2, wherein the defined emergency situations by the situation analysis engine are a situation in which the heart rate is significantly reduced or disappears, a situation in which fire or toxic gas ejection is detected by the peripheral sensors in the surrounding of the location tracking device, a situation in which the user's location is not tracked or deviates from the geo-fence area, and a situation in which the user's fall down is detected.

4. The method of claim 1, wherein the situation analysis engine includes a life/death determination block for determining the life/death of user by measuring the heart rate, the body temperature, the fall-down, an ejection of gas or toxic from the peripheral sensors in a surrounding where the location tracking device is located, a location tracking block for performing a location tracking with the GPS, the BLE, the WIFI Sniffing, or the UWB module, a loss-prevention block for detecting whether the user deviates from the geo-fence area and provide a notification service to the user about the deviation from geo-fence area, a fall down determination block for detecting whether the fall-down has occurred to the user and transmit the fall-down information to the network for an emergency processing.

5. The method of claim 1, wherein the Low Power IoT communication method is a Sigfox and a broadcasting transmission method.

6. The method of claim 1, wherein the step of selecting the most stable location tracking module of location tracking device among the GPS, the WIFI Sniffing, the BLE, and the UWB module comprising:

determining whether location tracking data is stably obtained using a module used for location tracking before determining the emergency situation based on the situation recognition information, if the location tracking data is not stably obtained using the used location tracking module, searching other location tracking module which is most stably obtainable the location tracking data, and obtaining the location tracking data by the searched location tracking module.

7. The method of claim 1, wherein the step of checking whether the situation recognition information and the location tracking data are transmitted through the real-time communication method rather than the Low Power IoT communication method in the detected emergency location, further comprising:

checking whether a response (ACK/NACK) message for the situation recognition information and the location tracking data sent from the location tracking device is received, checking whether the situation recognition information and the location tracking data is retransmitted based on an interference recovery operation when the response message indicates that the situation recognition information and the location tracking data are not properly transmitted to the network.

8. The method of claim 7, wherein the situation recognition information and the location tracking data are transmitted through the Low Power IoT communication method when the response (ACK/NACK) message for the situation recognition information and the location tracking data sent from the location tracking device is not received.

9. The method of claim 7, wherein the situation recognition information and the location tracking data are transmitted through one of a Long Range (LoRa), a Narrow Band Internet of Things (NB-IoT) communication method when the response (ACK/NACK) message for the situation recognition information and the location tracking data sent from the location tracking device is received, and the situation recognition information and the location tracking data are not retransmitted based on the interference recovery operation when the response message indicates that the situation information and the location tracking data are not properly transmitted to the network.

10. The method of claim 1, further comprising;
    checking whether the situation recognition information and the location tracking data are transmitted through the real-time communication method at certain interval when the response (ACK/NACK) message for the situation recognition information and the location tracking data sent from the location tracking device is not received and the situation recognition information and the location tracking data are transmitted through the low-power IoT communication method.

11. The method of claim 1, wherein the real-time communication method is an LTE (Long term evolution) Category (CAT) M1 communication method.

* * * * *